(12) United States Patent
Husemann et al.

(10) Patent No.: US 8,474,212 B2
(45) Date of Patent: Jul. 2, 2013

(54) TOWER FOR A WIND POWER PLANT

(75) Inventors: Klaus Husemann, Stemwede (DE); Willi Meiners, Bohmte (DE)

(73) Assignee: Rautaruukki Oyj, Vantaa (FI)

( * ) Notice: Subject to any disclaimer, the term of this patent is extended or adjusted under 35 U.S.C. 154(b) by 0 days.

(21) Appl. No.: 13/265,435

(22) PCT Filed: Apr. 22, 2009

(86) PCT No.: PCT/EP2009/002928
§ 371 (c)(1),
(2), (4) Date: Jan. 19, 2012

(87) PCT Pub. No.: WO2010/121630
PCT Pub. Date: Oct. 28, 2010

(65) Prior Publication Data
US 2012/0137621 A1    Jun. 7, 2012

(51) Int. Cl.
*E04H 12/00* (2006.01)
(52) U.S. Cl.
USPC ............... 52/651.07; 52/651.01; 52/656.9
(58) Field of Classification Search
USPC .............. 52/651.04, 651.06, 651.07, 651.08, 52/651, 9, 651.1, 656.9, 653.1, 843–846, 52/650.1, 651.01, 651.03, 194
See application file for complete search history.

(56) References Cited

U.S. PATENT DOCUMENTS

| 1,846,682 | A | * | 2/1932 | Hammel ............... 174/45 R |
| 1,870,914 | A | * | 8/1932 | Lane .................. 52/292 |
| 3,374,593 | A | * | 3/1968 | Rensch ................ 52/283 |
| 3,688,461 | A | * | 9/1972 | Rensch et al. ........ 52/653.1 |

(Continued)

FOREIGN PATENT DOCUMENTS

| DE | 103 08 176 | 9/2004 |
| DE | 10 2005 012817 | 9/2006 |

(Continued)

OTHER PUBLICATIONS

English Translation of International Preliminary Report on Patentability for International (PCT) Patent Application No. PCT/EP2009/002928, mailed Nov. 10, 2011, 8 pages.

(Continued)

*Primary Examiner* — Joshua J Michener
*Assistant Examiner* — Alp Akbasli
(74) *Attorney, Agent, or Firm* — Sheridan Ross P.C.

(57) ABSTRACT

The invention relates to a tower for a wind power plant having a plurality of corner bars (1) for forming a mast construction, wherein the corner bars (1) are each made up of a plurality of partial profiles (2) connected to each other and having opposing connection areas (3a, 3b) at which the adjacent partial profiles (2) of a corner bar (1) can be connected to each other, and wherein the partial profiles (2) each have two kink points in cross section extending in the longitudinal direction of the partial profiles (2) in a segment located between opposite connection areas (3a, 3b) of the partial profile. The corner bars (1) are each formed of at least three partial profiles (2), wherein the at least three partial profiles (2) of a corner bar (1) form a closed overall profile having an annular cross section, and that the joints at the connection of connection areas (3a, 3b) of adjacent partial profiles (2) of a corner bar (1) are each flush with an adjacent joint of an adjacent corner bar (1) extending the corner bar (1) in the longitudinal direction.

10 Claims, 4 Drawing Sheets

U.S. PATENT DOCUMENTS

| | | | | |
|---|---|---|---|---|
| 3,706,169 | A * | 12/1972 | Rensch | 52/263 |
| 4,218,859 | A * | 8/1980 | Sams | 52/194 |
| 4,646,505 | A * | 3/1987 | Paris | 52/843 |
| 4,893,445 | A * | 1/1990 | Hefer et al. | 52/234 |
| 5,271,204 | A * | 12/1993 | Wolf et al. | 52/836 |
| 5,864,998 | A * | 2/1999 | Loomer | 52/271 |
| 5,979,119 | A * | 11/1999 | Trafton | 52/40 |
| 7,160,085 | B2 * | 1/2007 | de Roest | 416/244 R |
| 7,392,624 | B2 * | 7/2008 | Kinzer | 52/194 |
| 2003/0000165 | A1 * | 1/2003 | Tadros et al. | 52/223.4 |
| 2009/0145073 | A1 * | 6/2009 | Takeshima et al. | 52/653.1 |
| 2009/0266024 | A1 * | 10/2009 | de la Chevrotiere | 52/653.1 |
| 2011/0094180 | A1 * | 4/2011 | Huesemann | 52/651.01 |

FOREIGN PATENT DOCUMENTS

| | | |
|---|---|---|
| DE | 10 2007 039957 | 2/2009 |
| EP | 1 442 807 | 8/2004 |
| WO | WO 2009/031175 | 3/2009 |

OTHER PUBLICATIONS

International Search Report prepared by the European Patent Office on Apr. 5, 2011 for International Application No. PCT/EP2009/002928.

* cited by examiner

TOWER FOR A WIND POWER PLANT

CROSS REFERENCE TO RELATED APPLICATIONS

This application is a national stage application under 35 U.S.C. 371 of PCT Application No. PCT/EP2009/002928 having an international filing date of 22 Apr. 2009, which designated the United States, the entire disclosure of which is hereby incorporated by reference.

The invention relates to a tower for a wind turbine having a plurality of corner bars for forming a mast construction, wherein the corner bars are each made up of a plurality of partial profiles connected to each other and having opposing connection areas at which adjacent partial profiles of a corner bar can be connected to each other, and wherein the partial profiles each have in cross section two kink points extending in the longitudinal direction of the partial profiles in a portion located between opposing connection areas of the partial profile.

Framework tower constructions having corner bars manufactured from angled profiles are sufficiently well known per se. The taller the tower and the larger the components mounted on the tower, such as in particular wind turbines, the greater the stresses on the angled profiles. These stresses can to a certain extent be compensated for by the use of profiles with larger profile cross sections. However, the size of the profile cross sections cannot be increased at will as there are production-related limitations on the manufacture of angled profiles.

There are numerous approaches to designing the corner bars of framework constructions such that taller towers can be built. It is, for example, known to weld together a plurality of angled profiles or to produce a cross-shaped profile for corner bars in advance at the manufacturing stage. This profile design is not optimal in terms of the geometrical moments of inertia which are obtained in the corner bar construction.

It is proposed in DE 103 08 176 A1 to manufacture corner bars from a shaped steel member, the profile of which has at least two flanks, wherein the flanks are connected by means of a beam. A lattice tower with such a design has the advantage that the profile of the corner bars has a stronger design as a result of an additional beam being provided. Corner bars result with a bending length which is significantly improved compared with that of conventional corner bars manufactured from angled profiles.

A further option for building tall towers is to increase the number of corner bars (there usually being four) in order to meet the stress requirements. The legs, connected by arrangements of cross braces, of the right-angled angled profiles that are generally used are then no longer located approximately in alignment, so that the struts are not connected parallel to the corresponding legs of the angled profiles. This is disadvantageous.

This problem can be overcome by the corner bars being made up of a plurality of partial profiles, generally up to four. However, in this solution four corner bars are also used for the mast construction.

It is disadvantageous that the radii of inertia which are important for the bending strength are very small as a large part of the cross-sectional area of the corner bars is in the region of the center of gravity. Accordingly, many intermediate supports for the corner bars using arrangements of struts are needed, which makes the structure considerably more complex.

Because of this problem, a construction for framework towers is advantageous in which the corner bars and the struts are formed from tubes. The concentration of material in the profile of the corner bars and in the profile of the struts is hereby in a statically optimal arrangement far removed from the neutral phase of the profile. However, the connections of the struts and the joints of the corner bars of such constructions are as a rule produced by welding. Welded connections are complex to manufacture. Moreover, weld seams have a high notch effect, for which reason they need to be significantly overdimensioned for dynamically loaded towers, as in the case of wind turbines, and therefore cannot realistically be considered. In particular against the backdrop of new generations of wind turbines where hubs are at a height of over 80 m and/or which have an output of over 2 megawatts, new approaches to the design of the framework construction have been developed owing to the high static and dynamic stresses on the tower construction.

A corner bar profile which has been optimized in terms of the use of material and assembly is described in EP 1 442 807 A1. A commercially common I-profile, which has a central web and flanges and is known as a "Peiner beam", is hereby brought into a new shape after the rolling process in the production of the profile so that the flanges include an angle of 90 degrees with one another. The new profile generated in this way can here be open or closed. In the latter case, the flanges are welded to one another at the contact line. This manufacturing method is complex as a further manufacturing process is required after the I-profile has been rolled.

An advantage of the abovementioned construction compared with angled profiles is the large cross-sectional area which can be achieved with just one profile, as well as the radius of inertia which is larger than with the angled construction. It is disadvantageous that the radius of inertia is considerably smaller (by a factor of 1.4) compared with a comparable tube, and that arrangements of struts for the corner bars do not introduce the forces in the direction of the center of gravity of the profile, so that the corner bars are twisted.

Another approach for producing corner bars with a closed profile is disclosed in DE 10 2005 012 817 A1. The use is described of an octagonal profile which consists of two open partial profiles and is closed when assembled. The cross section of the assembled profile corresponds more or less to a tube. The partial profiles are screwed together. The struts are assembled by means of connecting plates between the partial profiles so that the forces which occur are introduced by the struts virtually centrally into the corner bar formed by the screwed-together partial profiles. The assembly of the connection plates results in a gap between the screwed-together partial profiles. So that the static properties of the assembled profile correspond to those of a closed profile, further screwed connections of the partial profiles may, inter alia, therefore be required between the struts. A spacing element known as a tie plate is arranged at these additional screwed connections between the partial profiles. The required spacing of the additional screwed connections and thus the number of the required tie plates result from the bending strength of the profile halves with the lower geometrical moment of inertia.

Moreover, it follows from the geometrical conditions of the connection of the struts that approximating the corner bar profile to the statically favorable tubular shape leads to partial profiles with very different geometrical moments of inertia.

In the case of a tower with, for example, rectangular bars of the abovementioned construction, an angle of approximately 270 degrees results for the outer plate of the corner bar. Correspondingly, an angle of approximately 90 degrees results for the inner plate. In this case, a geometrical moment of inertia results for the inner plate which is small in comparison with the outer plate, thereby entailing a high number of additional screwed connections and tie plates between the strut connections. As the screwed connections have to be checked regularly, corresponding costs ensue which are dependent on the number of tie plates used. In addition, in the production of the profiles, it has proven to be the case that the manufacture of closed octagonal profiles is complex from a manufacturing point of view.

DE 10 2007 039 957 A1 discloses a tower construction for producing tall towers, in which two partial profiles are used to construct a corner bar which, when assembled to make an overall profile, form a corner bar segment. An internal contour which is formed by connecting three inner corner points of the overall profile has the approximate shape of a triangle. The external contour of the overall profile has connection areas for connecting plates to which struts of the lattice mast are fastened. The partial profiles have a different geometry and in addition must be provided with bends of up to 70 degrees. This is complex from a manufacturing point of view. In addition, large deformations in the material give rise to the risk that high residual stresses or pre-existing damage are introduced into the material by the deformation.

The tower construction is assembled by screw connections, preferably on site. In order to ensure that the screw connections of the profile halves are accessible, hand holes need to be provided in the partial profiles.

The object of the present invention is to provide an improved tower for a wind turbine with a corner bar construction for lattice masts, in which the corner bars have the same geometrical moment of inertia about both main axes and which can be manufactured and assembled as simply as possible.

The object is achieved with the tower having the features of claim 1.

Advantageous embodiments are described in the subclaims.

It is proposed that the corner bars are each formed of at least three partial profiles, wherein the at least three partial profiles of a corner bar form a closed overall profile having an annular cross section. This has the advantage that the partial profiles can be identical, wherein, in the region of the joints, integrated cross struts for forming a mast construction are oriented towards a joint of an adjacent corner bar of the corner bars arranged in a star shape in a framework tower.

Because, in such a symmetrical construction, the joints of a connection of connection areas of adjacent partial profiles of a corner bar are each flush with an adjacent joint of an adjacent corner bar extending the corner bar in the longitudinal direction, the connection of corner bars arranged one above the other, i.e. the connection of two corner bar segments to form a corner bar, can be simplified and the flow of force optimized.

At the two kink points in the area between the connection areas, the partial profiles are preferably bent with an internal angle $\alpha$ of 120° to 160°, preferably 140°.

It is particularly advantageous if the connection areas at opposing outer edges of a partial profile are bent with an internal angle $\beta$ of 110°. The opposing bent connection areas of adjoining partial profiles, which are connected to one another at the connection areas, should here be oriented parallel to one another. The connection areas of a partial profile should then in cross section be oriented relative to one another at an angle in the region of 115° to 125°, preferably 110°.

In this way, it is possible to form an overall profile of the corner bar with a closed cross section from the partial profiles, wherein the partial profiles can be connected to one another in a statically optimal manner by means of the connection areas oriented parallel to one another.

Moreover, it is advantageous if coupling plates are provided to couple partial profiles, said coupling plates each being connected at least to the two opposing connection areas of an associated partial profile. The partial profiles can be stiffened by means of these coupling plates in such a way that their connection areas which are otherwise connected only to connection areas of adjacent partial profiles are additionally stiffened by being connected to one another. The coupling plates ensure that the partial profiles of the corner bars are stiffened at the points which are particularly stressed by the introduction of forces from the cross struts, in particular if the coupling plates are attached at the same level as the cross struts.

It is particularly advantageous if at least two adjacent coupling plates are connected to each other by two corner bar segments which adjoin each other and form a corner bar. The coupling plates of two corner bar segments which adjoin each other and form a corner bar can, however, have a one-piece design. In this way, the coupling plates can serve to connect the partial profiles, arranged one above the other, of two corner bar segments or corner bars.

Moreover, it is advantageous if the coupling plates are bent at an angle $\delta$ in the region of 110° to 130°, preferably 120°, in an area located between the points of connection to the opposing connection areas of an associated partial profile. In this way, the coupling plates extend through the center of gravity of the associated corner bar so that the multiple coupling plates attached at the same height of a corner bar form a star joint which extends through the center of gravity of the corner bar and the free ends of which are directed towards the connection areas of the partial profiles of a corner bar. This star joint can be formed from a plurality of separate coupling plates or from a one-piece star-shaped coupling plate.

The coupling plates can each be guided between two connection areas of adjacent partial profiles, wherein the adjacent partial profiles are connected to one another at the two connection areas and the coupling plate. For this purpose, the coupling plates can have recesses such as, for example, bores which match corresponding fastening recesses/bores on the connection areas of the partial profiles, in order to guide fastening bolts or rivets through the aligned recesses and hence to connect the partial profiles to one another and to the coupling plate at the connection areas.

Moreover, it is advantageous if partial profiles of the lower corner bar segments of the mast construction have a different, preferably smaller, material thickness than the partial profiles of at least one corner bar segment arranged above the lower corner bar segments.

In this way, the amount of material used for the partial profiles can be minimized. It is, however, also conceivable for the profile geometry to vary depending on the differing static and dynamic stresses in the different portions over the height of the tower. The width and height of the cross section of the overall profile of the corner bar segments in the lower area of the tower structure can thus be greater than in the upper area.

The tower designed in the way explained above preferably has a height of more than 80 m and is thus suited and designed for relatively high stresses.

It is particularly advantageous if the corner bars are connected to one another by cross struts, wherein the cross struts attached at the same height to a corner bar are arranged and oriented in such a way that the longitudinal axes of the cross struts of a corner bar intersect at the center of gravity of the overall profile, formed by the partial profiles, of the corner bar.

The invention is explained in detail below with reference to an exemplary embodiment with the aid of the attached drawings, in which.

Figure 1:
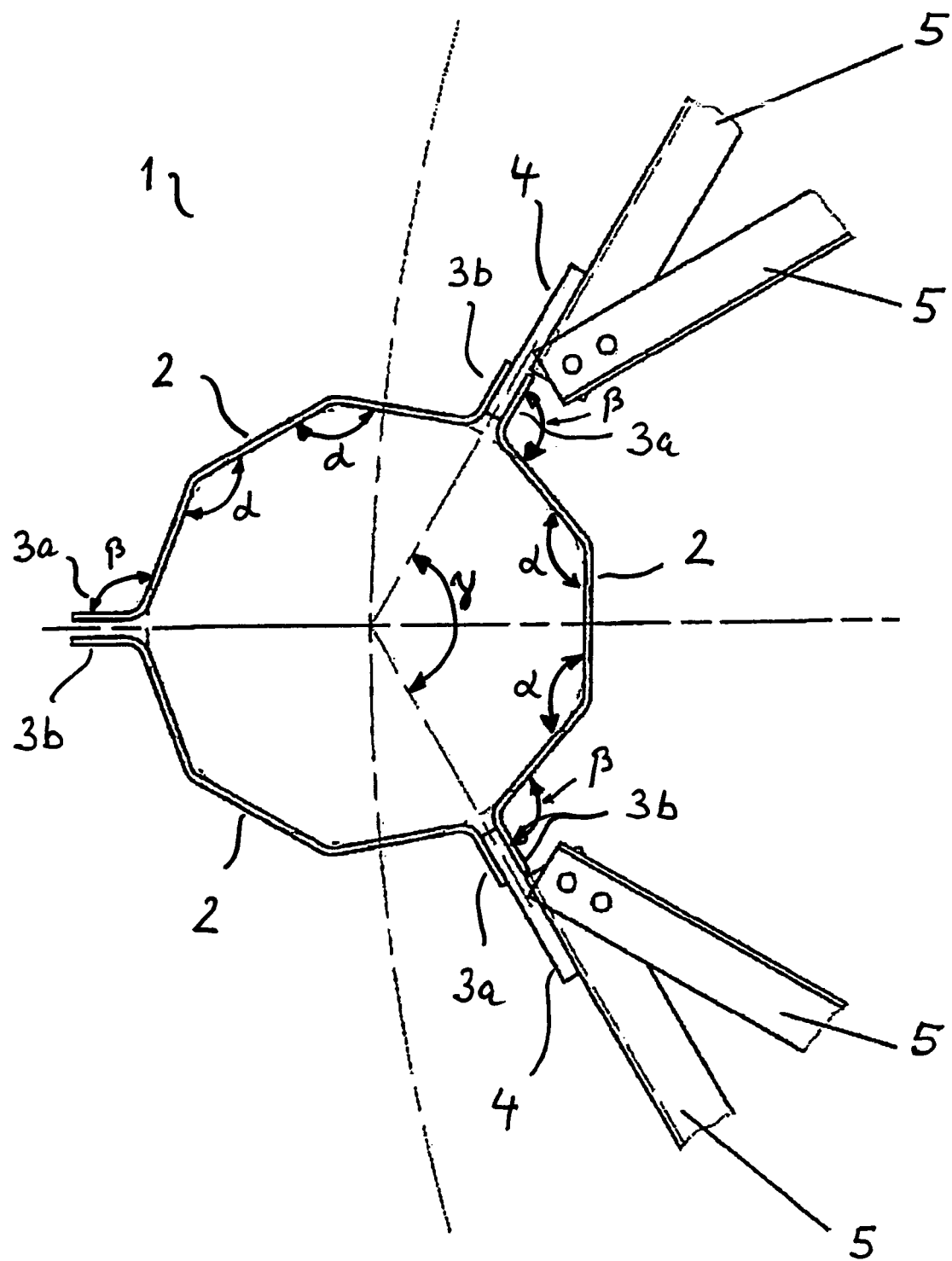
FIG. 1 shows a view of the cross section of a corner bar formed from three partial profiles, with cross struts at connection areas.

A horizontal cross section through a corner bar 1 can be seen in FIG. 1, which is formed from three identical partial profiles 2. The partial profiles 2 extend in a longitudinal direction (in the direction of viewing) and at the two free outer edges have connection areas 3a, 3b at which adjacent partial profiles 2 are connected to one another. By means of these connection areas 3a, 3b, the partial profiles 2 can be connected to one another in an annular shape to form a closed overall profile, in order to form a corner bar 1.

For this purpose, the connection areas 3a, 3b of adjacent partial profiles 2 are oriented parallel to each other and can in this way be screwed, welded or riveted to each other or fastened to each other in another way.

Joints, to which cross struts 5 can be attached, for example by means of coupling plates 4, are present at the connection of adjacent partial profiles 2 to the connection areas 3a, 3b. These cross struts 5 serve to connect a plurality of corner bars 1 which form a tower construction and are distributed over a circumference.

It can be seen that the partial profiles 2 are each bent twice by an angle $\alpha$ in the area between the opposing connection areas 3a, 3b. The angle $\alpha$ is in the region of 120° to 160° and is preferably approximately 140°.

Moreover, it is clear that the connection areas 3a, 3b are formed by bending the outer edges of the partial profiles 2 by an angle $\beta$. The angle $\beta$ is in the region of 115° to 125° and is preferably approximately 110°, taking into consideration the customary tolerances.

The connection areas 3a, 3b of a partial profile which are obtained by such a bending are oriented at an angle $\gamma$ to each other which is preferably in the region of 115° to 125° and is preferably approximately 120°. The partial profiles 2 of a corner bar 1 are thus also oriented at an angle $\gamma$ to each other of 115° to 125° and preferably approximately 120°. As illustrated, three partial profiles 2 then form an annular closed overall profile.

Figure 2:
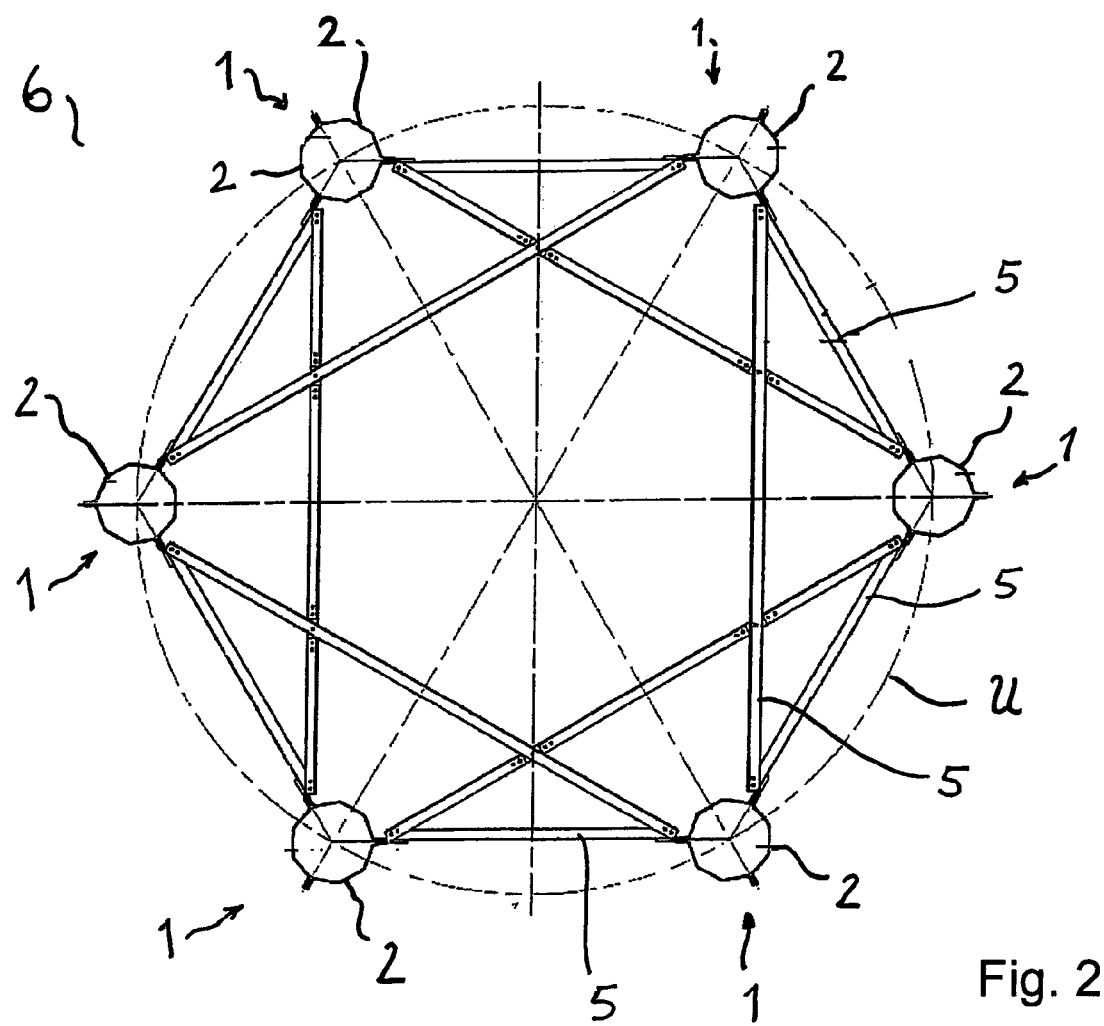
FIG. 2 shows a horizontal section through a tower with six corner bars arranged in a star shape, and cross struts between the corner bars.

In FIG. 2, a horizontal section through a tower construction 6 with six corner bars 2 arranged (in the shape of a star) on a circumference U can be seen.

The corner bars 2 consist, in the longitudinal direction, of a plurality of corner bar segments arranged one above the other which are each formed from three, preferably bent, partial profiles 2 shaped from sheet metal. The construction shown by way of example can, for example, be a lattice mast with six corner bars 2 and approximately 120 m tall. A wind turbine with an output of, for example, up to 2 megawatts is arranged on the lattice mast.

To stiffen the construction, corner bars 2 are connected, one below the other, to cross struts 5 which are attached at facing joints of the opposing corner bars 1. The sketch in FIG. 1 should also be referred to here.

It can be seen that the cross struts 5 of a corner bar 1 are guided to the respective immediately adjacent corner bars 1. In this way, a strut arrangement with four cross struts 5 per corner bar 1 is provided at a given height of a corner bar 1.

Figure 3:
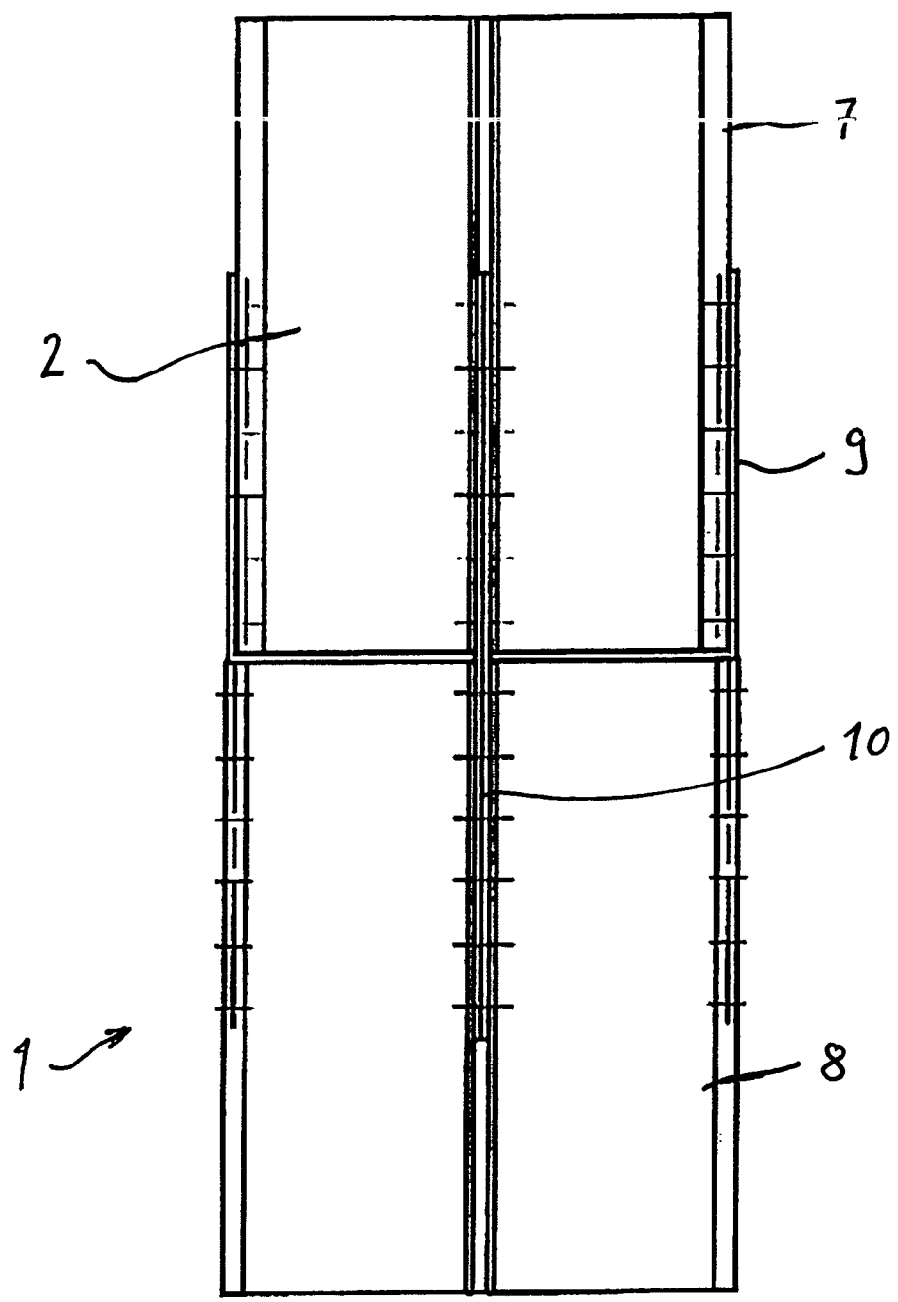
FIG. 3 shows a sketch of a portion of two corner bar segments, arranged one above the other, of a multi-part corner bar.

In FIG. 3 a sketch can be seen of a portion of two corner bar segments 7, 8, arranged vertically one above the other, of a corner bar 1. The upper corner bar segment 7 here has a smaller cross section than the lower corner bar segment 8. It can also be seen that the corner bar segments 7, 8 are connected to one another by means of central coupling plates 9, 10. These coupling plates 9, 10 form connection elements, by means of which the corner bar segments 7, 8 arranged one above the other are connected to one another and as a result of which the overall profile of the corner bar 2 is stiffened.

Figure 4:
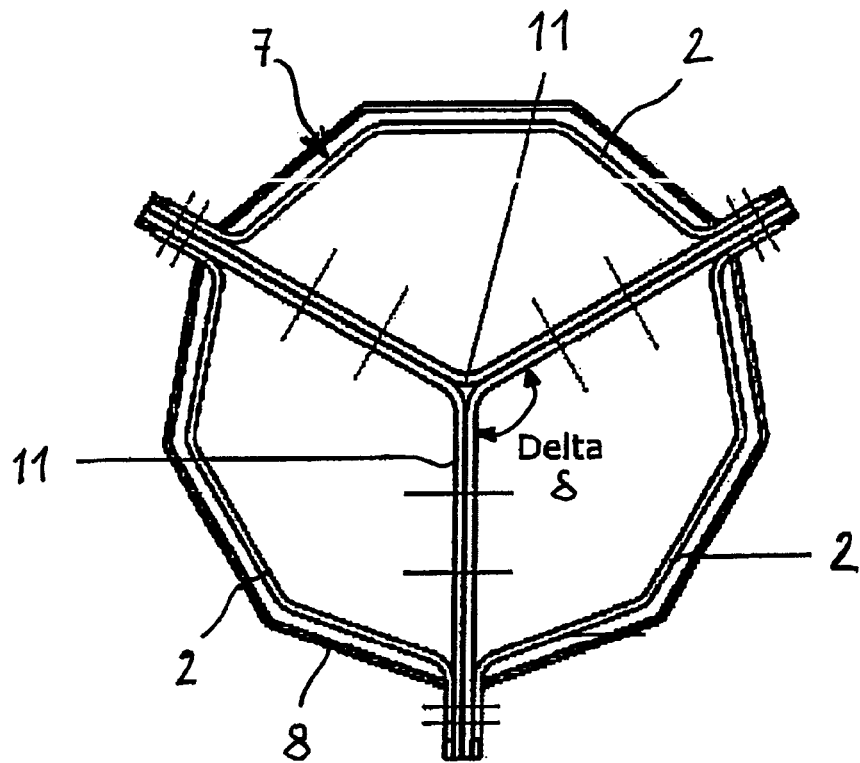
FIG. 4 shows a horizontal cross section through a corner bar with coupling plates connecting connection areas.

In FIG. 4 a sketch can be seen of a design, given by way of example, of a corner bar 1 which is formed from three partial profiles 2. The partial profiles 2 are in turn each stiffened by means of coupling plates 11 to form a closed profile, wherein the coupling plates 11 pass through the center of gravity of the corner bar 1 and form a connecting star.

These coupling plates 11 are preferably used in the middle segment of the height of the tower construction.

The material used for the overall profiles, i.e. the corner bars 1, is preferably a structural steel such as, for example, an S 355 quality fine-grained steel 12 m long and 8 mm thick. The partial profiles and/or cross struts can, however, also at least partially be formed by non-metallic materials such as, for example, laminated carbon fibers or fibrous natural materials.

Figure 5:
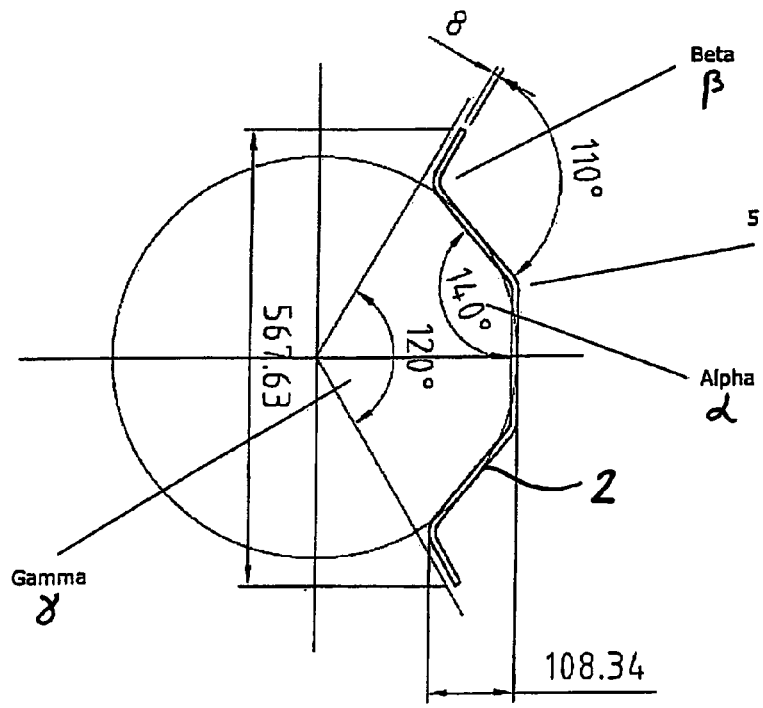
FIG. 5 shows a view in horizontal cross section of a partial profile with advantageous dimensions.

Advantageous dimensions are indicated in FIG. 5. In the partial profile 2 shown in FIG. 5 with a profile height of 108.34 mm and a profile width of 567.63 mm, the following geometrical moments of inertia result for the partial profiles 2:

For Each Identical Partial Profile
I max=141437000 mm$^4$
I min=743263 mm$^4$
Overall Profile
I overall=537327000 mm$^4$ Here the partial profiles 2 have an angle $\alpha$ of 140 degrees and two angles $\beta$ of 110 degrees each. Accordingly, in the tower construction opposing connection areas 3a, 3b of the corner bars 2 result which are oriented parallel to one another.

The angled connection areas 3a, 3b of the partial profiles 2 have a length which, on the one hand, allows the coupling plates 11, i.e. the connection pieces, to be assembled and, on the other hand, is designed to ensure the required stiffening of the profile.

The center of gravity of the geometrical moment of inertia is at the center of gravity of the overall profile. The forces introduced by the struts at a connection level into the individual corner bars 1 are also directed towards the center of gravity of the geometrical moment of inertia, as a result of which the torsional stress on the corner bars 1 is minimized.

The construction has the advantage that, when assembled, a virtually closed profile of the corner bar 1 is created, wherein the geometrical moments of inertia of the main axes of the corner bars 1 are virtually identical.

The overall profiles of the corner bars 1 form corner bar segments 7, 8. The corner bar segments 7, 8 are arranged vertically relative to one another and can be connected, for example, by means of a central joint plate, which can, for example, be coupling plates 9, 10 as shown in FIG. 3 or the star-shaped coupling plates 11 in FIG. 4. The central joint plates can have a one- or multi-part design.

It is particularly advantageous if the central joint plates consist of three coupling plates 11 connected to one another, as indicated in FIG. 4. These joint plates should, as shown, meet at the center of gravity in a star shape. These one-part and multi-part designs of the central joint plates joined together in a star shape are referred to below as star joints.

Compared with conventional coupling plates, the star joints have the advantage, from a manufacturing point of view, that the individual central joint plates of a corner bar joint consist of one part or of identical parts. The assembly of the corner bars 1 is simplified as a result of the prior assembly of the star joint formed from three bent coupling plates 11 (see FIG. 4). In addition, the star joint effects a stiffening of the corner bar profiles at the points which are particularly stressed by the introduction of forces from the cross struts 5. As a result of the forces introduced thus being directed towards the center of the corner bar 1, bending moments and torsion of the corner bars 1 are reduced as compared with conventional corner bar constructions such as, for example, corner bar constructions made from angle irons.

A gap is formed between the screwed-together partial profiles 2 as a result of the star joints for connection to the cross struts 5 being assembled. So that the assembled profile corresponds to a closed profile in terms of static properties, further screwed connections of the partial profiles 2 between the cross struts 5 may, inter alia, therefore be necessary. Two tie plates are arranged between the partial profiles, at the additional screwed connections.

As a rule, a lower static and dynamic stress exists in higher segments of tower structures than in lower segments of tower structures. A particularly advantageous design of the overall profiles results from varying the material thickness and/or varying the profile geometry such as, for example, the width and the height of the cross section of the overall profile. This makes it possible to minimize the amount of material used. In this respect, the use of fine-grained steel is in particular advantageous as the respective partial profiles made from this material can be manufactured precisely to the required static conditions.

As a rule, a lower overall profile cross section results from this optimization in higher segments of tower structures than in lower segments. If distances between the vertically arranged overall profiles screwed to the coupling plates 10, 11 and star joints result from this, the bores in the coupling plates 10, 11 and star joints are adapted accordingly. There is no longer any need for separate filler plates for a force-fitting connection by, for example, a screwed connection.

It is also advantageous if the material thickness of the lower corner bar segments is smaller than the material thickness of upper corner bar segments. This depends, for example, on the inclination of the corner bars 1.

The invention claimed is:

1. A tower for a wind turbine having a plurality of corner bars for forming a mast construction, wherein the corner bars are each made up of a plurality of substantially identical partial profiles connected to each other and having opposing connection areas at which adjacent partial profiles of a corner bar can be connected to each other, and wherein the partial profiles each have in cross section two kink points extending in the longitudinal direction of the partial profiles in a portion located between opposing connection areas of the partial profile, wherein the corner bars are each formed from at least three substantially identical partial profiles, wherein at least three partial profiles of a corner bar form a closed overall profile having an annular cross section;

in that the joints at the connection of connection areas of adjacent partial profiles of a corner bar are each flush with a respective adjacent joint of an adjacent corner bar extending the corner bar in the longitudinal direction; and wherein corner bars arranged on top of each other in direction of extension are interconnected by one or more coupling means converging radially from the connection areas of adjacent partial profiles preferably to a mass centre of the respective corner bar.

2. The tower as claimed in claim 1, characterized in that the kink points have an internal angle ($\alpha$) in the region of 120° to 160°, preferably 140°.

3. The tower as claimed in claim 1, wherein the connection areas at the opposing outer edges of the longitudinal sides of a partial profile are bent with an internal angle ($\beta$) of 110°, in that the opposing bent connection areas of adjoining partial profiles, which are connected to one another at the connection areas, are oriented parallel to one another, and in that the connection areas of a partial profile are in cross section oriented relative to one another at an angle in the region of 115° to 125°, preferably only 110°.

4. The tower as claimed in claim 1, wherein coupling plates are provided to couple partial profiles, said coupling plates each being connected at least to the two opposing connection areas of an associated partial profile.

5. The tower as claimed in claim 4, wherein at least two adjacent coupling plates are connected to each other by two corner bars which adjoin each other and form a corner bar segment.

6. The tower as claimed in claim 4, wherein the coupling plates of two corner bars which adjoin each other and form a corner bar segment have a one-piece design.

7. The tower as claimed in claim 4, wherein the coupling plates are bent at an angle ($\delta$) in the region of 110° to 130°, preferably 120°, in a portion located between the points of connection to the opposing connection areas of an associated partial profile.

8. The tower as claimed in claim 1, wherein the coupling plates are each guided between two connection areas of adjacent partial profiles, wherein the adjacent partial profiles are connected to one another at the two connection areas and the coupling plate.

9. The tower as claimed in claim 1, wherein partial profiles of the lower corner bar segments of the mast construction have a different, preferably smaller, material thickness than the partial profiles of at least one corner bar segment arranged above the lower corner bar segments.

10. The tower as claimed in claim 1, wherein corner bars are connected to one another by cross struts, wherein the cross struts attached at the same height to a corner bar are arranged and oriented in such a way that the longitudinal axes of the cross struts of a corner bar intersect at the center of gravity of the overall profile, formed by the partial profiles, of the corner bar.

* * * * *